Feb. 9, 1943.                     R. S. ESTEY                     2,310,623
                              POLARIMETRIC APPARATUS
                              Filed March 2, 1940                2 Sheets-Sheet 1
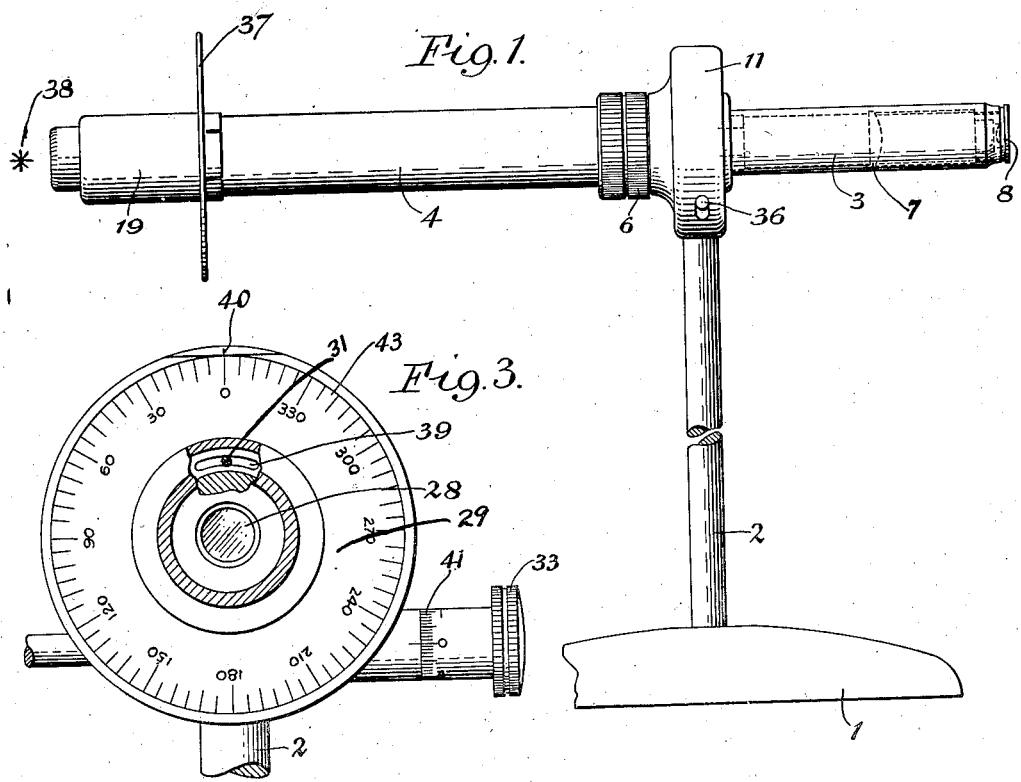
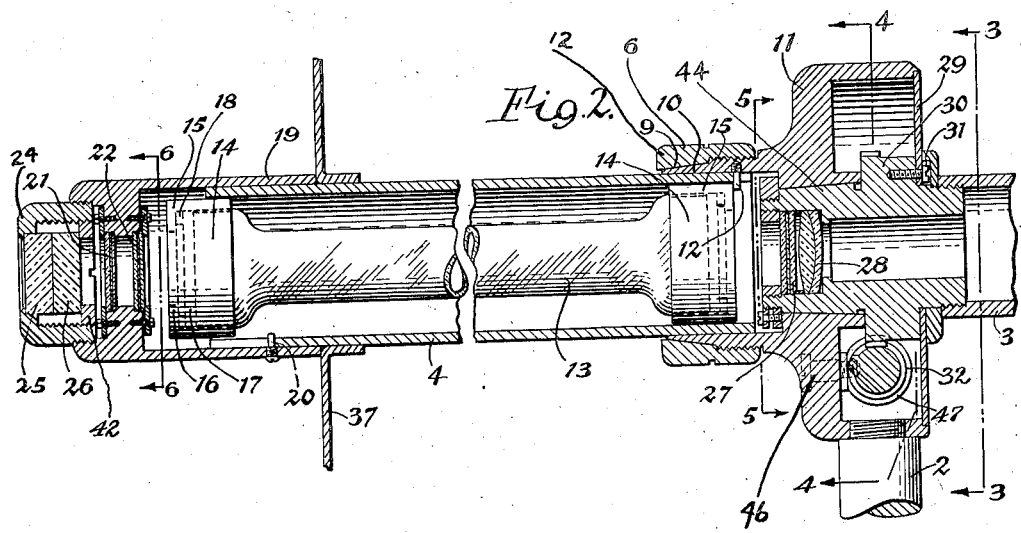
INVENTOR
ROGER S. ESTEY
BY
Raymond A. Paquin
ATTORNEY

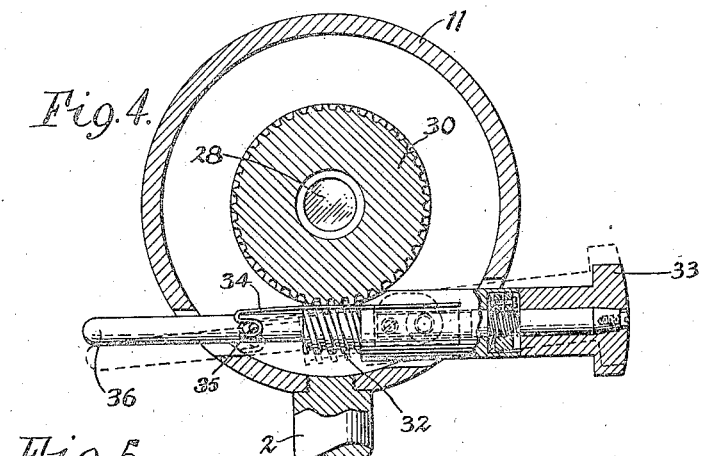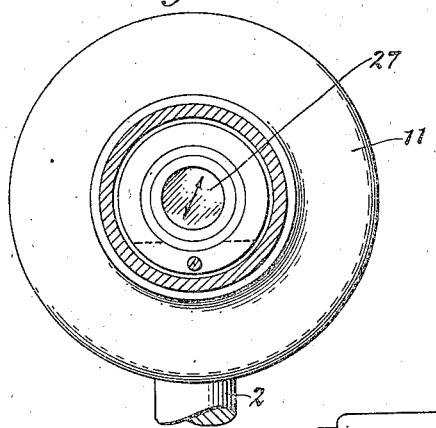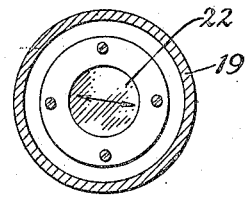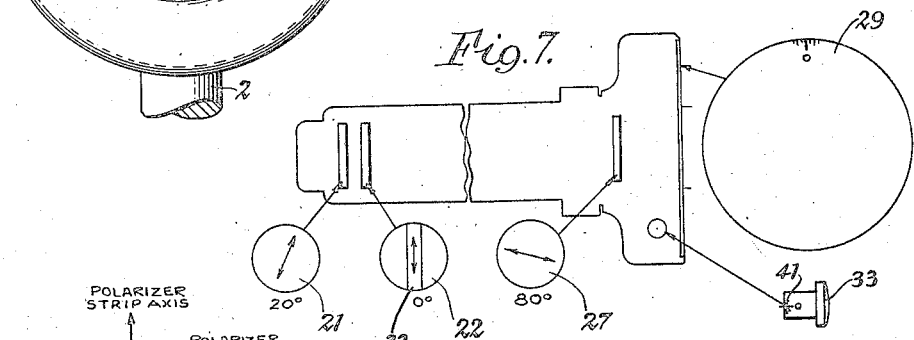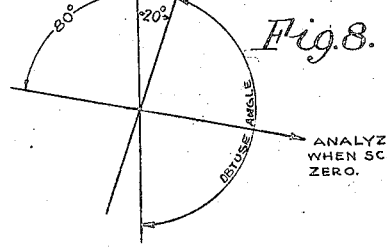

Patented Feb. 9, 1943

2,310,623

UNITED STATES PATENT OFFICE 2,310,623

POLARIMETRIC APPARATUS

Roger S. Estey, Buffalo, N. Y., assignor to Spencer Lens Company, Buffalo, N. Y., a corporation of New York Application March 2, 1940, Serial No. 321,845

5 Claims. (Cl. 88—14)

This invention relates to polarimetric apparatus and has particular reference to a new and improved device for identifying optically active substances and for measuring the amount of an optically active substance present by measuring the rotation of the plane of polarization of the substance.

One of the objects of the invention is to provide such a device which has been constructed to give greater convenience of operation.

Another object of the invention is to provide such a device which has been constructed to give a more simplified construction, and resultant economy of manufacture and yet give greater accuracy in results.

Another object of the invention is to provide easier result reading mechanism for such a device wherein the results may be more quickly and easily ascertained.

Other objects and advantages of the invention will become apparent from the following description taken in connection with the accompanying drawings. Many changes in the details of construction, and arrangement of parts may be made without departing from the scope of the invention as expressed in the accompanying claims. I, therefore, do not wish to be limited to the exact details shown and described, as the preferred form has been shown only by way of illustration.

Referring to the drawings:

Fig. 1 is a side elevation of an instrument embodying the invention;

Fig. 2 is a sectional view similar to Fig. 1, on an enlarged scale;

Fig. 3 is a front or face view of the scale arrangement;

Fig. 4 is a sectional view taken on line 4—4 of Fig. 2, looking in the direction of the arrows;

Fig. 5 is a sectional view taken on line 5—5 of Fig. 2, looking in the direction of the arrows;

Fig. 6 is a sectional view taken on line 6—6 of Fig. 2, looking in the direction of the arrows;

Fig. 7 is a diagrammatic side view of the device showing the scales and polarizing arrangement; and Fig. 8 is a diagrammatic front view of the instrument showing the effect of the polarizing arrangement.

Referring more particularly to the drawings wherein similar reference characters designate corresponding parts throughout the several views, the device shown embodying the invention comprises a base 1 on which is supported the upright 2.

The instrument which is supported on the upper end of said upright 2 comprises an eyepiece portion 3 and the casing 4, housing 11 and housing 19.

The eyepiece portion or member 3 contains the usual eyepiece lenses 7 and 8.

The casing 4 is secured to the member 11 by means of the threaded ring or collar 6 which has a tapered portion 9 engaging the tapered edge of the portion 10 of the housing member 11.

In the member 10 is provided a pin 12, engaging in a slot in the casing 4 and acting as a stop to locate the casing which casing in turn locates the housing 19 in desired position.

The sample tube or holder 13 is preferably made of glass or the like having a reduced central portion and enlarged end portions 14 which are preferably provided with integral threads adapted to screw into the caps 15 which are preferably of Bakelite, etc., although they may be of metal or other material. The caps 15 have the flanges 16 adapted to hold glasses 17 over the openings in the ends of the enlarged portions 14 to prevent escape of the sample in the tube. If desired, washers 18 may be provided between the flanges 16 and the glasses 17 to cushion the glasses 17 against the pressure of the caps.

At the outer extremity of the casing 4 is provided the member 19 fitting thereover and provided with a locating pin 20 which fits in a slot in the casing 4 and acts as a stop to locate the cap 19 and casing 4 in definite predetermined relation with each other and with the housing member 11.

The member 19 is provided with the polarizing members 21 and 22. The polarizing member 21 is formed of a disc of sheet polarizing material now commercially known as "Polaroid." This disc 21 has the axis of the light polarizing material adjusted to a desired orientation with respect to polarizing member 22.

The polarizing member 22 is preferably formed of a strip of "Polaroid" 23, as shown in Fig. 7 having a width substantially less than the width of the disc 21. For convenience the optical axis of said light polarizing material is parallel to the length of the strip.

The strip 22 is preferably mounted in the cap 19 in such a manner that its long direction is vertical.

The polarizing members 21 and 22 are spaced apart longitudinally.

In the end of the cap 19 is the filter holder 24 which is threadedly connected to said cap 19 and which comprises a cell containing one or more colored filters shown as 25 and 26 adapted to be held therein by the ring 42 having threads adapted to engage the threads on the inner surface of the cell 24.

The filter comprises an orange colored component 25 and a blue colored component 26.

The orange colored filter is preferably of such a color as to absorb wave lengths shorter than approximately 550 millimicrons while the blue filter is preferably of such a color as to absorb wave lengths longer than approximately 650 millimicrons. By adjusting the color and the thickness of these components the light transmitted by the filter can be made equivalent to light of a desired wave-length as for example 589 millimicrons.

With the above arrangement of orange and blue filter components it has been found much easier to adjust the transmission of the instrument to desired wave length than has been possible with prior art devices.

In the analyzer housing 11 is provided the "Polaroid" analyzing member 27 which has the axis of said light polarizing material oriented in a preferred manner with reference to the scale 41 and the polarizing members 21 and 22. The housing 11 also contains the telescope objective lens 28.

The lens 28 in cooperation with the eyepiece lenses 7 and 8 forms a telescope for viewing the strip 23 against the background formed by polarizer 21 by means of light rays passing through the tube 13. The strip 23 is longitudinally spaced with respect to the element 21 to permit the edges of the strip to be brought into sharp focus without interference from the member 21.

The dial 29 is secured to the gear member 30 by a screw or the like 31. This member 30 has the extension 44 having a tapered bearing surface adapted to engage the tapered bearing surface on the interior of the member 11. It will thus be apparent that by rotation of the member 30, the dial 29 will also rotate as will the analyzer 27.

The gear 30 is adapted to be rotated by turning the tube 3 when the worm gear 32 is not engaged. Said worm gear 32 is on a shaft having the fine adjustment knob 33 and is adapted to be held in engagement with the gear 30 by the spring member 34, a lip on which is secured at 35.

The worm and shaft are held in a bearing 47 by means of a pivot 46. The spring 34 simultaneously holds the worm gear 32 in engagement with the worm gear 30 and holds the bearing 47 in definite relation to the pivot 46.

The worm and shaft are so constructed that by pushing the end 36 downward the worm 32 is disengaged from the worm gear 30 and the gear 30 is adapted to be rotated in fast motion by rotating the tube 3 until the approximate angular position for making the measurement is reached and then the end 36 is pushed upwards rotating the worm and shaft about the pivot 46 and then by turning the knob 33 the exact measurement will be shown by the indications on the knob in cooperation with the coarser indications on the dial 29.

In the use of the instrument check measurements are usually made at an angle of 180 degrees removed from the original measurement. Movement into the check measuring position is facilitated by disengaging the worm 32 and rotating the gear 30 by turning the tube 3 as just described.

On the exterior of the casing 4 is the light shield 37 held thereon by friction and which may be moved back and forth to desired adjusted position to prevent light from the light source 38 from entering the eye of the operator during use of the instrument.

This is particularly important in view of the fact that the dials are read against the light.

It will be apparent that with the form of the member 30 shown that because of the combination of the worm gear and the cone bearing there has been provided a construction which is much simpler, economical and much less liable to become out of order than prior art devices.

With my arrangement involving the coarse scale on the dial 29 and the fine scale on the drum 33 it is much easier to read the results of the test and does not require special training of the operator as is necessary with prior art constructions.

The desired construction of the light polarizing arrangement is that there be a sheet of light polarizing material covering the whole field and a strip or other shape piece of light polarizing material covering a portion of the field.

One of the polarizing elements should preferably cover the whole field while the second element may have cut-outs in desired pattern. The disposition of the two pieces, including size and shape, is such that parts of the field are covered with one layer and other parts covered with two layers of said light polarizing material.

Alternatively the polarizing elements 21 and 22 may each comprise structures having a cutout pattern, the pattern on one being exactly complementary to the pattern on the other and cooperating to produce a result as though the field were covered with one and only one thickness or layer of sheet polarizing material, the orientation of the axis however being different in different parts of the field.

The functioning of the instrument is determined by the mutual angular relationships between the sheet 21 and strip 23 and analyzer sheet 27. For convenience I prefer to orient the optical axis of the polarizing strip 23 parallel to the long dimension of the strip and mount the strip in the instrument with its long dimension vertical. The orientation of the polarizing sheet 21 may have any value with respect to the strip 23, thereby affecting the sensitivity of the instrument. I prefer to set the axis of sheet 21 at an angle of approximately 20 degrees with respect to the axis of strip 23 as shown in Fig. 7. When no sample is in the holder 13 the analyzer containing the analyzer sheet 27 can be rotated to a position such that the three parts of the field shown at 22 in Fig. 7 are equally dark. Under these circumstances the optical axis of the analyzer 27 will be approximately 80 degrees to the vertical and the coarse and fine scales 29 and 33 will read either 0 degrees or 180 degrees.

The equality of darkness just mentioned occurs when the optical axis of the analyzer 27 substantially bisects the obtuse angle between the strip axis and polarizer axis as shown in Fig. 8.

The smaller the acute angle between the axes of elements 21 and 23, the greater the accuracy of the measurement but the less light will be transmitted. It has been found that by making the angle 20° the best compromise between light transmission and accuracy of measurement will be obtained.

It will be seen that when the light polarizing and analyzing means are arranged as shown in Fig. 7 and Fig. 8, the scales will all read 0.

In the dial 29 is provided a slot 39 in which the screw 31 may be moved to positively line up the indications on the dial and the indication mark 40 on the edge of the housing 11. The dial 29 and knob 33 carry suitable indication marks 41 and 43.

In operation the instrument is illuminated by monochromatic light or by other light modified by the filters 25 and 26. With no sample in the casing 4 the eyepieces 7 and 8 are adjusted to focus the telescope on the edges of the strip 23. The 0 setting of the instrument is verified by setting the dial 29 to 0 and setting the field of view so that the three portions are equally dark by means of the knob 33. The scale reading on the knob 33 is the 0 reading for the instrument.

The sample, customarily in the form of a transparent fluid, is introduced in the holder 13. The telescope eyepiece is readjusted to bring the edges of the strip 23 into focus and the analyzer 44 is rotated until the field of view is again uniformly dark.

The new angular position is determined from the indications on the dial 29 and knob 33. The difference between this angle and the 0 angle is the measure of the optical rotation of the sample.

From the above it will be seen that I have provided simple, efficient and economical means for carrying out all of the objects of the invention.

I claim:

1. In a device of the character described, means for supporting an optical system and for supporting a specimen holder in substantial optical alignment with said optical system, said optical system including observing means, an analyzer consisting essentially of a relatively thin sheet of light polarizing material supported for rotary movement between the specimen holder and the observing means, and a light polarizer unit in substantial optical alignment with the specimen holder on the side thereof opposite the analyzer, said light polarizer unit consisting of two members of sheet polarizing material, one of said members of said sheet polarizing material covering the entire field and the other member of said sheet polarizing material covering only a central portion of the field, the axis of polarization of the polarizing member covering only a portion of the field being disposed at an acute angle with respect to the axis of polarization of the adjacent polarizing member covering the entire field with said acute angle being such as to obtain substantially the greatest sensitivity and accuracy of test and yet not reduce the transmitted light below an efficient intensity, with said angular dispositions of the axes of polarization of said polarizing member covering only a portion of the field and said adjacent polarizing member covering the entire field being in known fixed relation with each other for aiding in determining the initial setting of the axis of the analyzer.

2. In a device of the character described, means for supporting an optical system and for supporting a specimen holder in substantial optical alignment with said optical system, said optical system including observing means, an analyzer consisting essentially of a relatively thin sheet of light polarizing material supported for rotary movement between the specimen holder and the observing means, and a light polarizer unit in substantial optical alignment with the specimen holder on the side thereof opposite the analyzer, said polarizer unit consisting of two members of sheet polarizing material, one of said members of said sheet polarizing material covering the entire field and the other of said members being a strip member of said sheet polarizing material covering only a central portion of the field, the axis of polarization of the polarizing member covering only a portion of the field being disposed at an acute angle with respect to the axis of polarization of the adjacent polarizing member covering the entire field with said acute angle being such as to obtain substantially the greatest sensitivity and accuracy of test and yet not reduce the transmitted light below an efficient intensity, with said angular dispositions of the axes of polarization of said polarizing member covering only a portion of the field and said adjacent polarizing member covering the entire field being in known fixed relation with each other for aiding in determining the initial setting of the axis of the analyzer.

3. In a device of the character described, means for supporting an optical system and for supporting a specimen holder in substantial optical alignment with said optical system, said optical system including observing means, an analyzer consisting essentially of a relatively thin sheet of light polarizing material supported for rotary movement between the specimen holder and the observing means, and a light polarizer unit in substantial optical alignment with the specimen holder on the side thereof opposite the analyzer, said light polarizer unit consisting of two members of sheet polarizing material, one of said members of said sheet polarizing material covering the entire field and the other member of said sheet polarizing maerial covering only a central portion of the field, the axis of polarization of the polarizing member covering only a portion of the field being disposed at an angle of approximately 20 degrees with respect to the axis of polarization of the adjacent polarizing member covering the entire field with said angle being such as to obtain substantially the greatest sensitivity and accuracy of test and yet not reduce the transmitted light below an efficient intensity, with said angular dispositions of the axes of polarizatoin of said polarizing member covering only a portion of the field and said adjacent polarizing member covering the entire field being in known fixed relation with each other for aiding in determining the initial setting of the axis of the analyzer.

4. In a device of the character described, means for supporting an optical system and for supporting a specimen holder in substantial optical alignment with said optical system, said optical system including observing means, an analyzer consisting essentially of a relatively thin sheet of light polarizing material supported for rotary movement between the specimen holder and the observing means, and a light polarizer unit in substantial optical alignment with the specimen holder on the side thereof opposite the analyzer, said polarizer unit consisting of two members of sheet polarizing material, one of said members of sheet polarizing material covering the entire field and the other of said members being a strip member of said sheet polarizing material covering only a central portion of the field, the axis of polarization of the polarizing member covering only a portion of the field being disposed at an angle of approximately 20 degrees with respect to the axis of polarization of the adjacent polarizing member covering the entire field with said angle being such as to obtain substantially the greatest sensitivity and accuracy of test and yet not reduce the transmitted light below an efficient intensity, with said angular dispositions of the axes of polarization of said polarizing member covering only a portion of the field and said adjacent polarizing member covering the entire field being in known fixed relation with each other for aiding in determining the initial setting of the axis of the analyzer.

5. In a device of the character described, means for supporting an optical system and for supporting a specimen holder in substantial optical alignment with said optical system, said optical system including observing means, an analyzer between the specimen holder and the observing means, and a light polarizer unit in substantial optical alignment with the specimen holder on the side thereof opposite the analyzer, said light polarizer unit consisting of two members of sheet polarizing material, one of said members of said sheet polarizing material covering the entire field and the other member of said sheet polarizing material covering only a portion of the field and leaving portions exposed on the opposed sides thereof and said member covering only a portion of the field extending at least to the center of the field, the axis of polarization of said polarizing member covering only a portion of the field being disposed at an acute angle with respect to the axis of polarization of the adjacent polarizing member covering the entire field with said acute angle being such as to obtain substantially the greatest sensitivity and accuracy of test and yet not reduce the transmitted light below an efficient intensity, with said angular dispositions of the axes of polarization of said polarizing member covering only a portion of the field and said adjacent polarizing member covering the entire field being in known relation with each other for aiding in determining the initial setting of the axis of the analyzer.

ROGER S. ESTEY.